April 24, 1962   R. DESCARRIES   3,031,637
ELECTRICAL COUPLING DEVICE
Filed April 1, 1958   2 Sheets-Sheet 1

INVENTOR
Raymond Descarries
BY
his ATTORNEY

April 24, 1962  R. DESCARRIES  3,031,637
ELECTRICAL COUPLING DEVICE
Filed April 1, 1958  2 Sheets-Sheet 2

INVENTOR
Raymond Descarries
BY
his ATTORNEY

United States Patent Office 3,031,637
Patented Apr. 24, 1962

3,031,637
ELECTRICAL COUPLING DEVICE
Raymond Descarries, Montreal, Quebec, Canada, assignor to Aktiebolaget Electrolux, Stockholm, Sweden, a corporation of Sweden
Filed Apr. 1, 1958, Ser. No. 725,734
1 Claim. (Cl. 339—105)

This invention relates to electrical coupling devices, and more particularly to devices for adapting terminal portions of electrical line cords for connection to sources of electrical power.

For purposes of convenience, coupling devices have been developed for providing elements which are readily engaged or disengaged for detachably connecting electrical power sources with electrical appliances and the like. For example, the use of plugs and sockets with engageable male and female members is well known.

Devices of this type must provide for effective electrical continuity and must also provide connections which are firm even though being readily detachable. Moreover, such devices must not constitute weak links in the mechanical structures of the electrical systems in which they are incorporated. That is, they must resist the application of mechanical forces without becoming defective.

In this latter regard, it is to be considered that despite the fact that most plugs comprise bodies which are capable of being grasped, many individuals remove plugs from sockets by grasping the associated line cords and exerting forces thereupon. This is both destructive and dangerous since these forces are directly transmitted by the line cord to the terminals to which its leads are connected in the associated plug.

Accordingly, it is an object of the invention to provide an improved coupling device which takes into account the aforenoted abusive action by preventing forces from being transmitted by a line cord to its terminals in the device.

It is recognized that prior attempts have been made to provide a solution for the above-mentioned problem and that, to this end, molded plugs have been provided which maintain line cords in fixed relation to the plugs attached thereto. Molded plugs, however, are deficient in that they cannot be removed from line cords without great difficulty, if at all, for purposes of repair and maintenance. Other devices avoiding the same problem are subject to similar deficiencies.

Accordingly, it is a further object of the invention to provide for "strain relief" while at the same time providing an improved coupling device which is easily disassembled for purposes of maintenance, repair and replacement.

Still another requirement for plugs and like devices is that they shield their internal elements for safety reasons and from disturbances which might be created by the presence of foreign material such as dust or moisture which might cause short circuits. To this end, the objects of the invention include providing an improved structure which is substantially impermeable to foreign materials.

To achieve the above and other of its objects, the invention contemplates, in accordance with a preferred embodiment thereof, a coupling device wherein a solid insulating block supports terminals in spaced relation and is detachably engaged within an elastic casing. The casing is provided with a bore through which an electrical line cord can be passed and, within the casing, the line cord is divided into its individually insulated wires or leads. For the purpose of strain relief, the insulating block is provided with grooves for accommodating the separate leads and these grooves define irregular or serpentine passages for the leads so that no force can be directly transmitted to the associated terminals. As will be shown, the entire structure is further fashioned so as to provide for all the benefits which would be derived from an integral molded structure, but with the further advantage that provision is made for ready disassembly.

Advantageously, the individual components of the improved structure considered separately, are of simple design susceptible of being manufactured with mass production techniques and with a view toward economy of both materials and labor. Further, it will be noted that the assembling of the coupling device is such a simple matter as to avoid the need for special skills or tools. In fact, the engagement of the above-noted insulating block with its associated casing requires only a simple insertion of the block into the casing to provide an integrated structure having substantial mechanical strength and all of the advantages which have been noted above.

Reference will next be made to the accompanying drawing in which is illustrated a preferred embodiment of the invention and in which.

Figure 1:
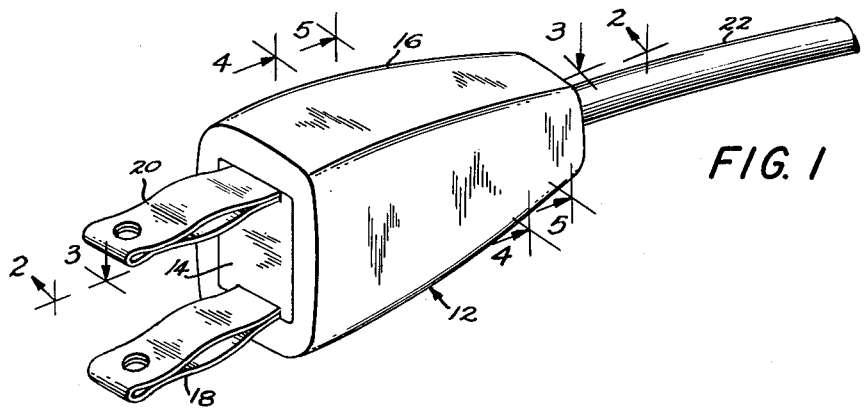
FIGURE 1 is a perspective view of a plug assembly provided in accordance with the invention and having attached thereto a section of an electrical line cord.
Figure 2:
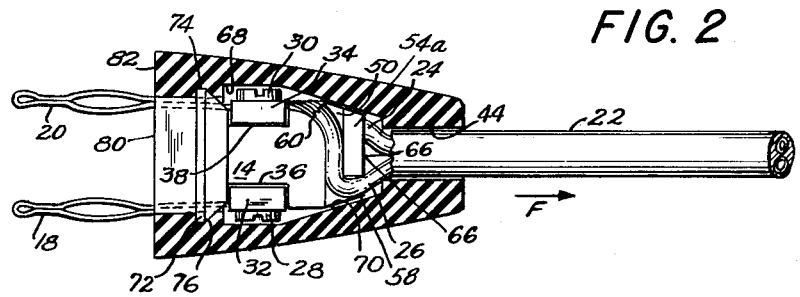
FIGURE 2 is a sectional view of the plug assembly taken along line 2—2 of FIG. 1.
Figure 3:
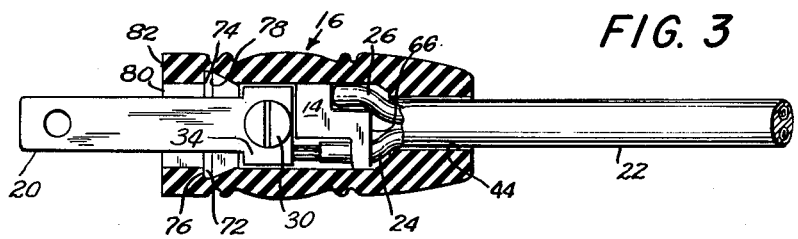
FIGURE 3 is a sectional view of the plug assembly taken along line 3—3 of FIG. 1.
Figure 4:
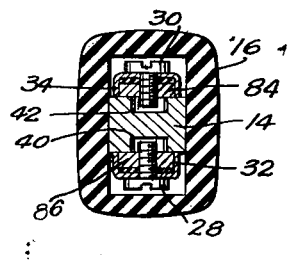
Figure 5:
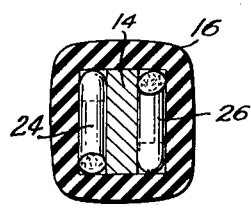
Figure 8:
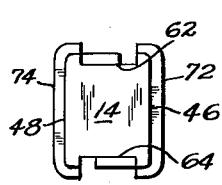
Figure 6:
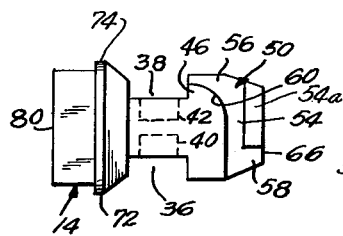
Figure 9:
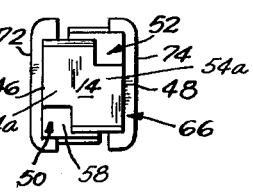
Figure 7:
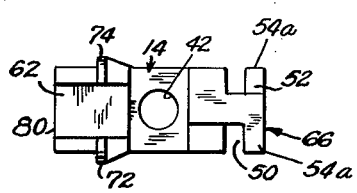
Figure 10:
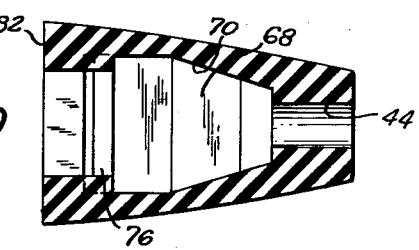
Figure 11:
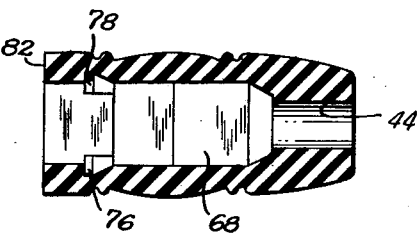

FIGURES 4 and 5 are respectively transverse sections of the plug assembly taken along lines 4—4 and 5—5 of FIG. 1;

FIGURE 6 is a side view of an insulating block which constitutes one of the elements of the assembly;

FIGURE 7 is a top view of the insulating block;

FIGURES 8 and 9 are respectively front and rear views of the insulating block; and FIGURES 10 and 11 are respectively sectional views of an elastic casing provided for the insulating block, the views corresponding to those of FIGS. 2 and 3.

In FIG. 1, a plug 12 provided in accordance with a preferred embodiment of the invention comprises an insulating block 14, an elastic casing or sheath 16 and contact blades or prongs 18 and 20. Attached to the plug 12 is a flexible power line or line cord 22 which is attached to an electrical appliance or utility device. The plug 12 functions to couple the line 22 detachably to an electrical socket and is so constructed that the connection of the line 22 to the plug 12 is not weakened or otherwise affected by forces applied by pulling on the line 22. Moreover, the plug 12 is so constructed that foreign materials cannot enter its interior portion and, further, to provide for the ready removal of the casing 16 from the block 14 by an operation which moves the casing 16 axially along the line 22.

The line 22, as illustrated in FIGS. 2 and 3, consists of two separately insulated leads or wires 24 and 26 as is conventional in commonly used electrical circuits. The invention, however, contemplates that other multi-lead lines are used and the provisions of the invention are readily adapted for three-phase lines and the like.

The leads 24 and 26 are respectively coupled to prongs 18 and 20 at terminals including screws or bolts 28 and 30 and supports or brackets 32 and 34 which are integral with the prongs. The bolts 28 and 30 can be threadably engaged with the brackets 32 and 34 or else nuts can be provided to engage the bolts in a manner conventional per se.

The terminals are accommodated in recesses or indented regions 36 and 38 formed in opposite sides of the insulating block 14. These recesses are open at their respective ends for facilitating manufacture and the manipulation of the terminals. Thus, with the casing 16 detached from the insulating block 14 and moved outwardly along the line 22, leads 24 and 26 are connected in detachable manner to their associated terminals which are then placed in grooves or indented regions 36 and 38. It should be noted that the terminals are preferably freely movable with respect to the block 14, although it is possible to provide a positive connection therebetween. The free movement facilitates use and avoids special manufacturing requirements. Reference to FIG. 4 will show that supplemental recesses 40 and 42 can be provided to accommodate extensions of the bolts, it being apparent that recesses 40 and 42 can be dimensioned and threaded for positive engagement of the bolts.

Leads 24 and 26 are not brought directly to the terminals and, in fact, are caused to follow an irregular or serpentine path. To this end, the casing 16 defines a bore 44 which forms a hollow sleeve for receiving the line 22 and restraining the same against transverse or lateral displacement. Preferably, at the inner end of bore 44, line 22 is separated into its two individually insulated leads, these leads being given, in part, a direction which is transverse to the block 14 as indicated in FIG. 5 as well as in FIG. 2.

For this purpose, the block 14 is provided on opposite faces 46 and 48 (FIGS. 6-9) with transverse openings or open grooves 50 and 52 each including, as shown for example for groove 50, a transverse portion 54 defined by a rib 54a and two portions 56 and 58 extending from opposite ends of portion 54 and in opposite directions to the recess 38 and toward the bore 44 (FIG. 2), respectively. Groove 50 is defined at one section by a curved wall 60 which avoids sharp bends in the wire.

With each of the leads 24 and 26 following irregular or serpentine paths, any force exerted on line 22 in the direction indicated generally by arrow F in FIG. 2 undergoes a substantial attenuation because of friction and because the force is divided into a number of lesser components due to grooves 50 and 52. In practice, substantially none of the exerted force is communicated to the terminals of the device.

Aside from the lead 22 which is accommodated in the bore 44, only the prongs 18 and 20 extend into the interior of the plug 12 from the outside. To insure against the entry of foreign material such as dust and moisture, the prongs 18 and 20 are accommodated in grooves 62 and 64 (see FIGS. 7 and 8). These latter grooves are of sufficient depth so that the prongs are substantially flush with the respective surfaces of the block 14 and have a width to accommodate the prongs without play. The prongs 18 and 20 are confined to the grooves 62 and 64 by the elastic casing 16 whose tight engagement of the block 14 is not impaired thereby.

As is evident, one end 66 (FIGS. 2 and 6) of the block 14 is adapted for insertion into cavity 68 (FIGS. 10 and 11) of casing 16. To facilitate positioning therebetween, end 66 is given a cone-like or pyramidal configuration in correspondence with the portion 70 of the cavity 68. Thus, upon engagement between the inner and outer body members 14 and 16 (the insulating block and elastic casing), these members are coaxially related along a common longitudinal axis.

To maintain the inner and outer body members in fixed relationship, these members are provided with corresponding and mating recesses and protrusions. Thus, for example, the block 14 is provided with ledges or ridges 72 and 74 (see especially FIGS. 6-9) and casing 16 is provided with corresponding recesses 76 and 78 (see especially FIGS. 10 and 11). It will be appreciated that the inherent resiliency of casing 16 enables it to ride over ledges 72 and 74 and to engage the same with a snap-like action.

In FIGS. 2 and 3, it can be seen that ridges 72 and 74 and recesses 76 and 78 are equally spaced from ends 80 and 82 of their respective body members 14 and 16. Consequently, the ends 80 and 82 are in flush, coplanar relationship to simulate an integral, molded part to avoid presenting irregularities which might be accidentally engaged and thus effect a separation of the body members and a possible displacement of prongs 18 and 20. Moreover, accumulations of dust and other foreign materials are avoided which might otherwise be deposited in cracks and at the resultant ledges.

Referring briefly to FIGS. 6-9, the insulating block 14 will next be considered independently. This block is essentially an elongated cube bounded by four opposing walls and terminating in ends 66 and 80. The block defines lateral recesses 36 and 38 for accommodating terminals, and longitudinal grooves 62 and 64 for accommodating prongs coupled to these terminals. Moreover, the block provides grooves 50 and 52 for directing the leads of electrical power lines along irregular or serpentine paths which, as noted above, provides for strain relief. The recesses and grooves 36, 38, 62 and 64 are preferably positioned in one set of opposite faces, whereas the grooves 50 and 52, which are angularly or transversely disposed relative to the longitudinal axis of the block 14, are positioned on a different or the second set of faces. This arrangement is preferable since it permits the leads 24 and 26 to be held in position in their respective grooves by hand while the ends of the leads are being fastened by means of bolts 28 and 30 to the associated terminals.

With further regard to the block 14, it is to be noted in FIGS. 8 and 9 that this member is multi-sided and generally is rectangular in cross-section. Along with the corresponding cross-section of the cavity 68 of the casing 16, this insures against rotational displacement between the inner and outer body members of the plug.

The block 14 is preferably a solid member in the assembly although the invention contemplates that this block might alternatively be elastic with the casing 16 being solid. Both of these members are, however, electrical insulators with the block 14 maintaining the lead terminals in spaced relationship to insure against short circuits. Moreover, the block 14 preferably supports these terminals at the greatest possible spacing to insure against arcing between leads or terminals. The block 14 may be, for example, hard rubber, plastic, wood or the like.

Referring next to the casing 16 as particularly shown in FIGS. 10 and 11, this member is preferably elastic. The prongs 18 and 20 which extend unidirectionally along block 14 are confined by casing 16 in their respective grooves and casing 16 also serves to protect the interior of plug 12 both mechanically and electrically. The casing 16 is preferably made of rubber.

For installation, the casing 16 is positioned on a line 22 which is passed through bore 44 opening into cavity 68. Leads 24 and 26 are connected by bolts 28 and 30 (using nuts 84 and 86 as shown in FIG. 4 if necessary) to prongs 18 and 20, preferably with the leads in position in grooves 50 and 52 to account for the lengths of lead required. The block 14 is then inserted into casing 16 where it is engaged with a snap-like action. The assembled plug is then ready for use.

Should it subsequently become desirable to use the plug on a different line cord, its removal is simple. The casing 16 is readily disengaged from block 14 because of the cone-like configuration of cavity 68 and it can be moved axially along line 22, whereupon it becomes a very simple matter to detach the leads from the associated terminals. Repairs or maintenance can be effected in a similar manner.

In conclusion, attention is directed to the fact that the elements of the structure set forth are susceptible of economical production methods since no particularly difficult manufacturing problems are presented. The invention provides, furthermore, a strain resisting plug to which inures all of the benefits of molded plugs without the deficiencies thereof.

There will now be obvious to those skilled in the art many modifications and variations of the structure set forth which do not depart essentially from the spirit of the invention as defined in the following claim.

What is claimed is:

A fitting for the terminals of a pair of electrical conductors comprising an elongated inner body of insulating material having front and rear sections and an intermediate section therebetween and a hollow sleeve therefor enveloping all of the sections, the sleeve having an opening of reduced cross-sectional area at its rear end for the conductors, the intermediate section having a pair of indented regions at opposing sides of the body, a pair of spaced contact blades extending lengthwise of the front section of the body from the intermediate section and projecting beyond the front end of the body, means at the indented regions for connecting the terminals to the rear ends of the contact blades, at least the rear end section of the body and inner surface of the rear sleeve part enveloping the rear end section being four-sided, the first and second opposing sides of the rear end section and the first and second opposing inner surfaces of the rear sleeve part, which are contiguous thereto, being substantially parallel, the third and fourth opposing sides of the rear end section having at least their rearwardmost parts sloping toward each other toward the rear end of the body, the third and fourth opposing inner surfaces of the rear sleeve part sloping toward each other toward the rear end of the body and having zones contiguous to the sloping sides of the body, the first and second opposing parallel sides of the rear end section having zig-zag shaped indentations for the terminals each including a central arm substantially perpendicular to the longitudinal axis of the body and end arms extending lengthwise of the body in opposite directions from the central arm, the parts of the rear end section defining the central arms providing spaced walls forming grooves, the part of the rear body section at the first side which defines the wall of one groove nearer to the rear end of the body being contiguous to the sloping part at the third inner surface of the sleeve and removed from the sloping part at the fourth inner surface of the sleeve, the part of the rear body section at the second side which defines the wall of the other groove nearer to the rear end of the body being contiguous to the sloping wall part at the fourth inner surface of the sleeve and removed from the sloping wall part at the third inner surface of the sleeve, and the zig-zag shaped indentations being formed on the rear body section so that the portions of the indentations thereon defining the end arms which extend in opposite directions from the central arms form the inner walls of grooves extending lengthwise of the body, the sloping wall parts at the third and fourth inner surfaces of the sleeve which overlie the end arms defining the outer walls of the last-mentioned grooves.

References Cited in the file of this patent

UNITED STATES PATENTS

| | | |
|---|---|---|
| 862,520 | Stewart | Aug. 6, 1907 |
| 2,032,780 | White | Mar. 3, 1936 |
| 2,033,973 | Clayton | Mar. 17, 1936 |
| 2,157,919 | Reese | May 9, 1939 |
| 2,201,578 | Grohsgal | May 21, 1940 |